UNITED STATES PATENT OFFICE.

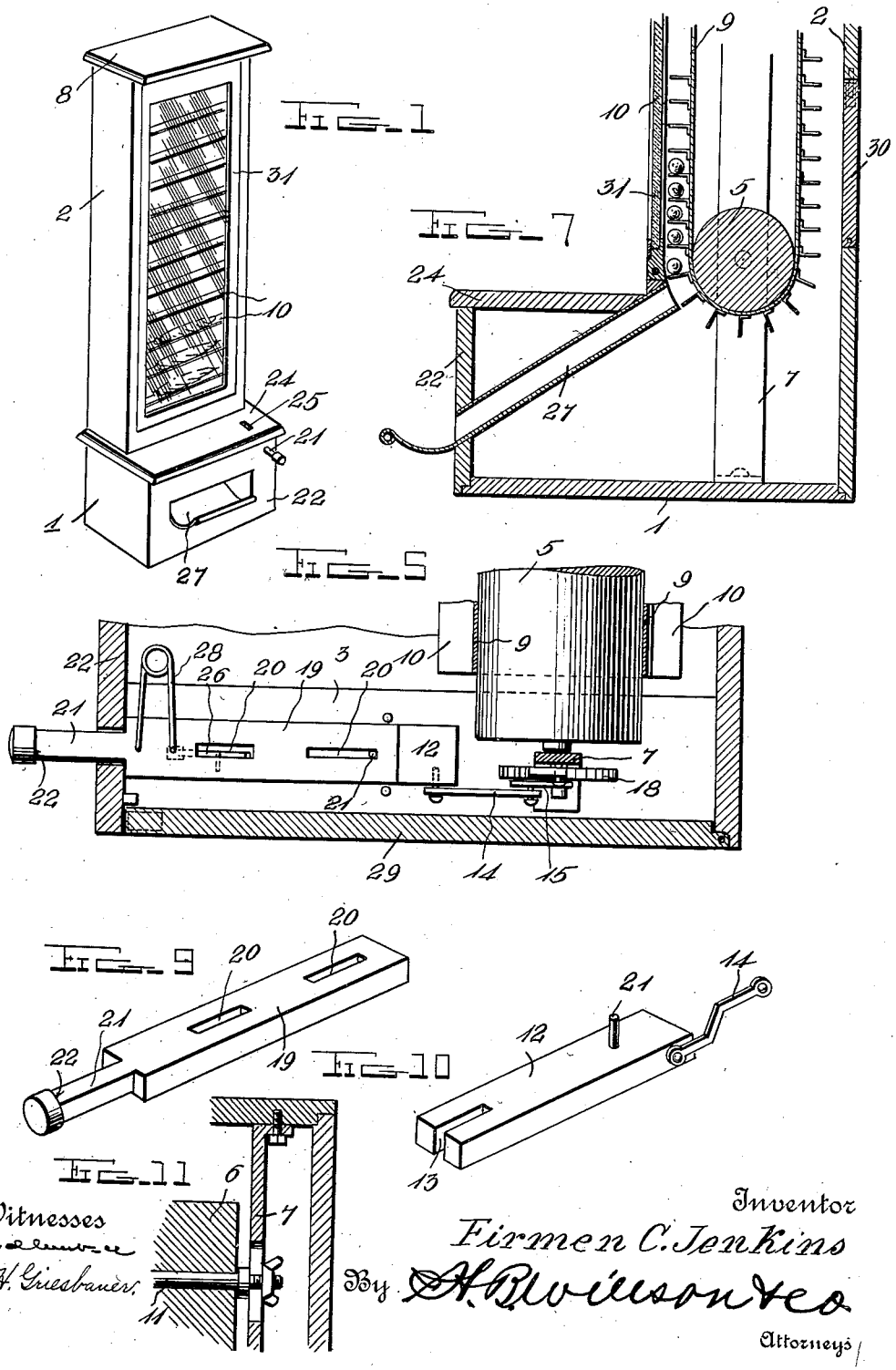

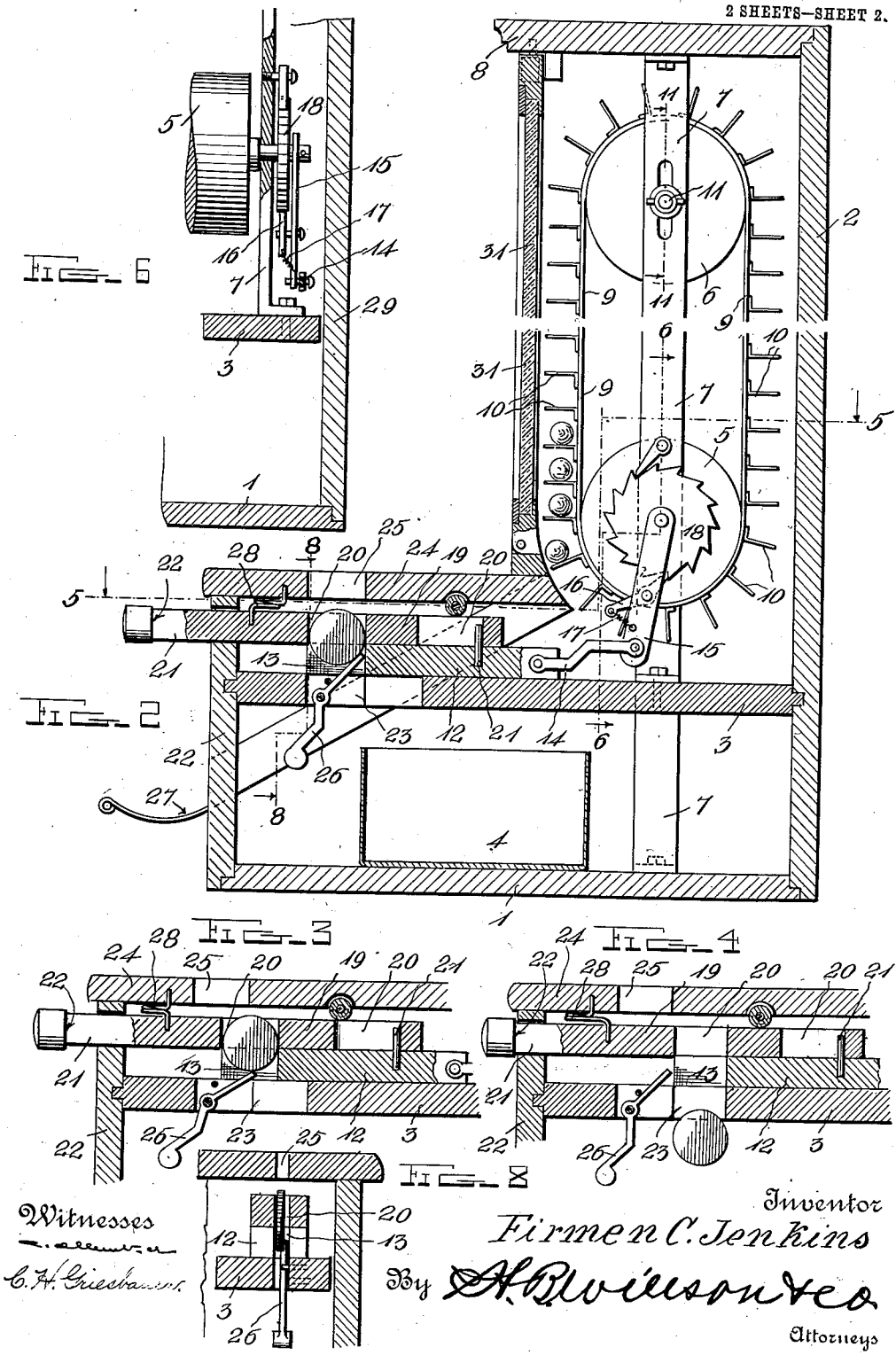

FIRMEN C. JENKINS, OF VILLISCA, IOWA.

CIGAR-VENDING MACHINE.

No. 898,654.　　　　Specification of Letters Patent.　　Patented Sept. 15, 1908.

Application filed December 12, 1907. Serial No. 406,126.

*To all whom it may concern:*

Be it known that I, FIRMEN C. JENKINS, a citizen of the United States, residing at Villisca, in the county of Montgomery and State of Iowa, have invented certain new and useful Improvements in Cigar-Vending Machines; and I do declare the following to be a full, clear, and exact description of the invention, such as will enable others skilled in the art to which it appertains to make and use the same.

This invention relates to new and useful improvements in cigar vending machines and has for its object a production of a simple and efficiently operating device of this kind which will automatically deliver a single cigar at each operation, the operation of the device being controlled by the insertion of a coin in the slot.

In the accompanying drawings:—Figure 1 is a perspective view of the machine; Fig. 2 is a vertical sectional view of Fig. 1 on an enlarged scale; Fig. 3 is a fragmentary sectional view of the carrier actuating mechanism, the same being represented in an intermediate position; Fig. 4 is a similar view, the actuating mechanism in discharging position; Fig. 5 is a horizontal sectional view taken on the line 5—5 of Fig. 2; Fig. 6 is a vertical sectional view taken on the line 6—6 of Fig. 2; Fig. 7 is a central vertical sectional view of the lower portion of the machine; Fig. 8 is a cross sectional view taken on the line 8—8 of Fig. 2; Figs. 9 and 10 are detail perspective views of the operating member embraced in the carrier actuating mechanism; and Fig. 11 is a vertical sectional view taken on the line 11—11 of Fig. 2.

Referring to the drawings which are for illustrative purposes only, and therefore not drawn to scale, it will be seen that a device constructed in accordance with the invention comprises a suitable base 1, and an upright casing or frame 2.

In carrying out the invention a suitable horizontal support 3 is arranged a suitable distance above the bottom of the machine base and below said support is arranged a suitable money receiving box or receptacle 4. A drum or cylinder 5 is horizontally arranged in the upright casing or frame 2, a suitable distance above the support 3 and a second drum or cylinder 6 also arranged within the casing or frame, a suitable distance above the first mentioned drum or cylinder. These drums or cylinders are journaled between suitable upright supporting members 7, one being arranged between the support 3 and top 8 of the casing, and the other preferably between the top of the casing and the bottom of the machine. An endless carrier 9 of any material having suitable flexibility is arranged to work over the drums or cylinders, said carrier being provided throughout its length with longitudinally spaced cigar holding members 10.

In practice, the axle 11 on which the upper drum or cylinder is journaled, has a slotted connection with the upright supporting members, see Fig. 11, so that it may be adjusted to secure the proper tension of the carrier 9.

An actuating block or member 12 of preferably flat rectangular form is mounted to slide on the support 3, said block or member having a suitable longitudinal slot 13 formed in its outer end, the purpose of which will be shown. A connecting link or member 14 is loosely connected preferably to one side and adjacent to the extreme inner end of said actuating block or member at one end and at its opposite end, with the free end of a vertically disposed bar 15 connected at its upper or inner end to the adjacent end of the axle to which the drum or cylinder 5 is fixed. A pawl 16 is pivoted to the inner face of the bar 15 and a spring 17 arranged between the free end of the pawl and the lower end of said bar, the tendency of said spring being to normally hold the pivot end of the pawl in engagement with one of the teeth of a ratchet 18 fixed to one end of the axle to which the drum or cylinder 5 is fixed. An operating block or member 19 of preferably flat rectangular form is mounted to slide on the block or member 12 the former being formed with two longitudinal spaced slots 20, the outermost of which is designed to register with the slot 13 in the block or member 12 and the innermost of which is adapted to receive a pin 21 extending from the inner end of the block or member 12. Said block or member 19 is formed at its outer end with a stem or reduced portion 21 designed to extend through a corresponding aperture formed in the front wall 22 of the machine base, a shoulder 22 being formed at the outer end of said stem, the purpose of which will be disclosed.

In carrying out the invention the support 3 is formed with a longitudinal slot 23 of a length equal to twice that of the recess 13 of the actuating block or member 12, and the top piece 24 of the machine base with an elongated slot 25 to normally register with the recess and outermost of the slots of the actuating and the slot of the operating blocks or members 12 and 19, respectively. A trip member 26 is pivoted at a suitable point between its ends to one wall of the slot 23 in the support 3, the pivot end of said trip member normally extending into the slot of the actuating block or member 12. The slots of the support and the actuating and operating members are of corresponding width and are of such width that should a cent be dropped through the slot 25 in the top piece, 24, of the machine it would fall through the slots in the operating and actuating block or member and the slot of the support 3 without engaging the pivot end of the trip device, but should a nickel be dropped through the slot 24 it being thicker would engage said end of the trip device.

In practice, a nickel having been dropped through the slot 25, the operator presses inwardly on the outer end of the operating block or member during which operation, the pivot end of the trip device is depressed by the coin, see Fig. 3, until the operating member has reached the end of its stroke when the coin falls through the slot 23 of the support 3 into the money box or receptacle 4. During this operation the carrier is also caused to turn one step or notch through the medium of the connections between the actuating block and axle of the shaft to which the drum 5 is fixed for actuating the ratchet 18 bringing one of the cigar carriers opposite the inner end of a suitably inclined chute 27 extending through the base of the machine at a point to one side of the carrier actuating mechanism. When the operating member has been released by the operator it is turned to its normal position by the action of a suitable spring 28 connected at one end with the top piece of the machine base which position is determined by the length of the innermost slot 20 of the former.

A suitable door as indicated at 29 is arranged at one side of the base to permit of the insertion or removal of the money box or receptacle 4 and a suitable door as indicated at 30 arranged at the rear wall of the casing to permit of access to the interior thereof when it is necessary to replenish the supply of cigars on the carrier. The front of the casing may also be closed in by a glass door or frame 31 by means of which it can be readily ascertained when the supply of cigars on the carrier has been about exhausted.

Having thus fully described my invention, what I claim is new and desire to secure by Letters-Patent of the United States, is as follows:—

In combination with a delivery apparatus, a horizontal supporting shelf having a longitudinal slot and coin controlled mechanism mounted upon the supporting shelf for actuating the delivery apparatus, said mechanism comprising an actuating block having a coin receiving slot of less length and to register with the slot of the supporting shelf, a coin supporting device pivoted to one side wall of the slot of the supporting shelf and having a portion to normally project into the slot of the actuating block, a pin arising from the actuating block and an operating member mounted upon the actuating block, said member having a coin receiving slot to normally register with that of the actuating block and a second longitudinal slot to receive said pin, the latter slot permitting predetermined longitudinal movement of the supporting member independently of the actuating block.

In testimony whereof I have hereunto set my hand in presence of two subscribing witnesses.

FIRMEN C. JENKINS.

Witnesses:
S. H. COLEMAN,
W. A. WALLACE.